United States Patent [19]

Kurokawa et al.

[11] Patent Number: 5,659,675
[45] Date of Patent: Aug. 19, 1997

[54] APPARATUS FOR TRANSMITTING AND BACKING UP VIDEO DATA OR IMAGE DATA

[75] Inventors: Kuniaki Kurokawa, Kamakura; Hiroyuki Horii, Yokohama, both of Japan

[73] Assignee: Canon Kabushiki Kaisha, Tokyo, Japan

[21] Appl. No.: 465,117

[22] Filed: Jun. 5, 1995

Related U.S. Application Data

[63] Continuation of Ser. No. 962,346, Oct. 16, 1992, abandoned.

[30] Foreign Application Priority Data

Oct. 18, 1991 [JP] Japan ................................. 3-270929
May 29, 1992 [JP] Japan ................................. 4-139095
Jul. 24, 1992 [JP] Japan ................................. 4-198658

[51] Int. Cl.⁶ ............................................. G06F 15/00
[52] U.S. Cl. .................................................. 395/133
[58] Field of Search ................................. 395/162, 163, 395/164, 139, 133, 127

[56] References Cited

U.S. PATENT DOCUMENTS 4,641,263  2/1987  Pearlman ................................. 364/900
5,220,650  6/1993  Barkans .................................. 395/163

*Primary Examiner*—Phu K. Nguyen
*Attorney, Agent, or Firm*—Fitzpatrick, Cella, Harper & Scinto

[57] ABSTRACT

A video data transmission arrangement writes video data processed for transmission into a detachable data card. The video data stored in the data card is converted into time-continuous video signals which are processed to enable confirmation of the transmitted video data at the transmitter. Video data can be stored in a video memory and updated at regular time intervals to provide backup and a processor operates to freeze the video data in the video memory upon operation of a freeze switch. The video data stored in the video memory is compressed at each update or when a freeze operation is performed. The compressed video data is stored in a random access memory that is continuously supplied with power from a battery. A compression/expansion circuit reads and expands the compressed video data from the random access memory and delivers the expanded video data to the video memory.

23 Claims, 16 Drawing Sheets

APPARATUS FOR TRANSMITTING AND BACKING UP VIDEO DATA OR IMAGE DATA

This application is a continuation of application Ser. No. 07/962,346 filed Oct. 16, 1992, now abandoned.

BACKGROUND OF THE INVENTION

1. Field of the Invention

The present invention broadly relates to video data transmission apparatus having a frame memory and, more particularly, to a video data transmission apparatus for recording a plurality of batches of video information or data which have been transmitted or received. The present invention also is concerned with a video data transmission apparatus for backing up video data.

2. Description of the Related Art

A description will be given of a first known type video data transmission apparatus.

Transmission of video data through a high-speed digital circuit network, e.g., ISDN (Integrated Service Digital Network) has become popular in recent years. Such transmission is generally conducted by converting video data into digital video data, storing the digital video data in a semiconductor memory such as a frame memory and then outputting the digital video data to a circuit network through a MODEM (Modulation and Demodulation Device).

FIG. 1 shows an example of such a video data transmission apparatus. Referring to FIG. 1, a control program stored in a program memory unit 115 is executed by a system control unit 113. A work area necessary for the system control unit 113 to execute the control program is reserved in a random access memory unit 116. An address decoder unit 114 selects one of the program memory unit 115, random access memory unit 116 and a frame memory unit 117 in accordance with an address value output from the system control unit 113.

Video data which have been input through an input terminal 101 are processed by a signal processing unit 102 and the processed signals are converted by an A/D conversion unit 103 into discrete digital video data which are then latched by a latch unit 104. The digital video data is stored in the frame memory unit 117 via a data bus, under the control of the system control unit 113.

On the other hand, when digital video data stored in the frame memory unit 117 are transmitted through a circuit network, the digital video data is sent to a MODEM 111 together with additional data for communication control, by the operation of the system control unit 113 in accordance with a predetermined communication protocol. The digital video data is then sent to the circuit network (not shown) via the circuit line terminal 109 under the control of an NCU (network control unit), after an operation to match the electrical characteristics of the circuit network. Transmission of the next batch of video data is then conducted after the next batch of signals is stored in the frame memory unit 117 as is the case of the transmission of the preceding batch of signals.

The digital video data stored in the frame memory unit 117 are then latched by a latch unit 108 and are converted into analog signals by a D/A conversion unit 107, and these analog signals are processed by a signal processing unit 106. The processed signals are then output from an output terminal 105 to form an image on a display which is not shown.

In the known video data transmission apparatus as described, transmission is conducted such that, after the transmission of a batch of signals is completed, the next batch of signals is stored in the frame memory 117. Therefore, video data which have been transmitted can not be confirmed at the transmitting station or at the receiving station.

Furthermore, when reproduction of the same transmitted video data is to be conducted both at the transmitting station and the receiving station, a voice message has to be used to inform, from one station to the other, the index of the transmitted video data selected by the one station or the time record of transmission of such video data.

A description will now be given of a second known type of apparatus.

Most current video devices are battery-driven, in order to cope with the demands for use outdoors and for greater portability. In such apparatuses, it is very important to minimize electrical power consumption. The requirement for reduction in electrical power consumption is not severe in devices for storing ordinary information other than video information, since in such a case the amount of data is so small that the information can be safely stored in, for example, in a main memory of a CPU, with continued supply of little electrical power to at least such a main memory.

In the case of video information, however, the amount of the data is so large that storage of input video data in a video memory requires supply of a large amount electrical power to the video memory. Therefore, the video information cannot be held for a long time when power is derived from batteries.

Therefore, known video devices, e.g., video cards for monitor output, are not constructed to keep video data stored in a video memory. When the apparatus is re-started after turning off the power, it is necessary to rewrite the necessary video data in the video memory. In other words, the original video information is lost when the video memory is not rewritable.

SUMMARY OF THE INVENTION

In view of the shortcoming of the first known type, it is a first object of the present invention to provide a video data transmission apparatus which enables confirmation of video data which has already been transmitted, either at the transmitting or receiving end, thereby overcoming the above-described shortcoming of the first known type.

It is another object of the present invention to provide a video data backup system which eliminates the above-described problem of the second known type.

According to one aspect of the present invention, there is provided a video data transmission apparatus, including: a processor means for processing input video data; a frame memory for temporarily storing the video data processed by the processing means; a transmission unit for effecting a predetermined processing on the video data stored in the frame memory and transmitting the processed data; a writing unit for writing, in a data card mounted in the apparatus video data which is the same as the video data processed and transmitted by the transmission unit; and a reproduction unit for reproducing video signals on the basis of the video data stored in the data card.

According to a second aspect of the present invention, there is provided a video data backup apparatus, including: a video memory; a data storage unit; a compression unit for compressing, at a first timing, video data stored in the video memory and for writing the compressed video data in the data storage unit; an expansion unit for expanding, at a second timing, the compressed video data stored in the data storage unit and for writing the expanded video data in the video memory; and a control unit for starting the compression unit at the first timing and for starting the expansion unit at the second timing.

These and other objects, features and advantages of the present invention will become clear from the following description of the preferred embodiments taken in conjunction with the accompanying drawings.

BRIEF DESCRIPTION OF THE DRAWINGS

FIG. 11 is a flow chart showing operation performed by the embodiment shown in FIG. 9 when power is turned on;

FIG. 15 is a flow chart showing an operation performed by the embodiment shown in FIG. 13 when power is turned on.

DESCRIPTION OF THE PREFERRED EMBODIMENTS

The first to third embodiments of the present invention, pertaining to the first aspect of the present invention, will be described with reference to FIGS. 2 to 8.

Figure 1:
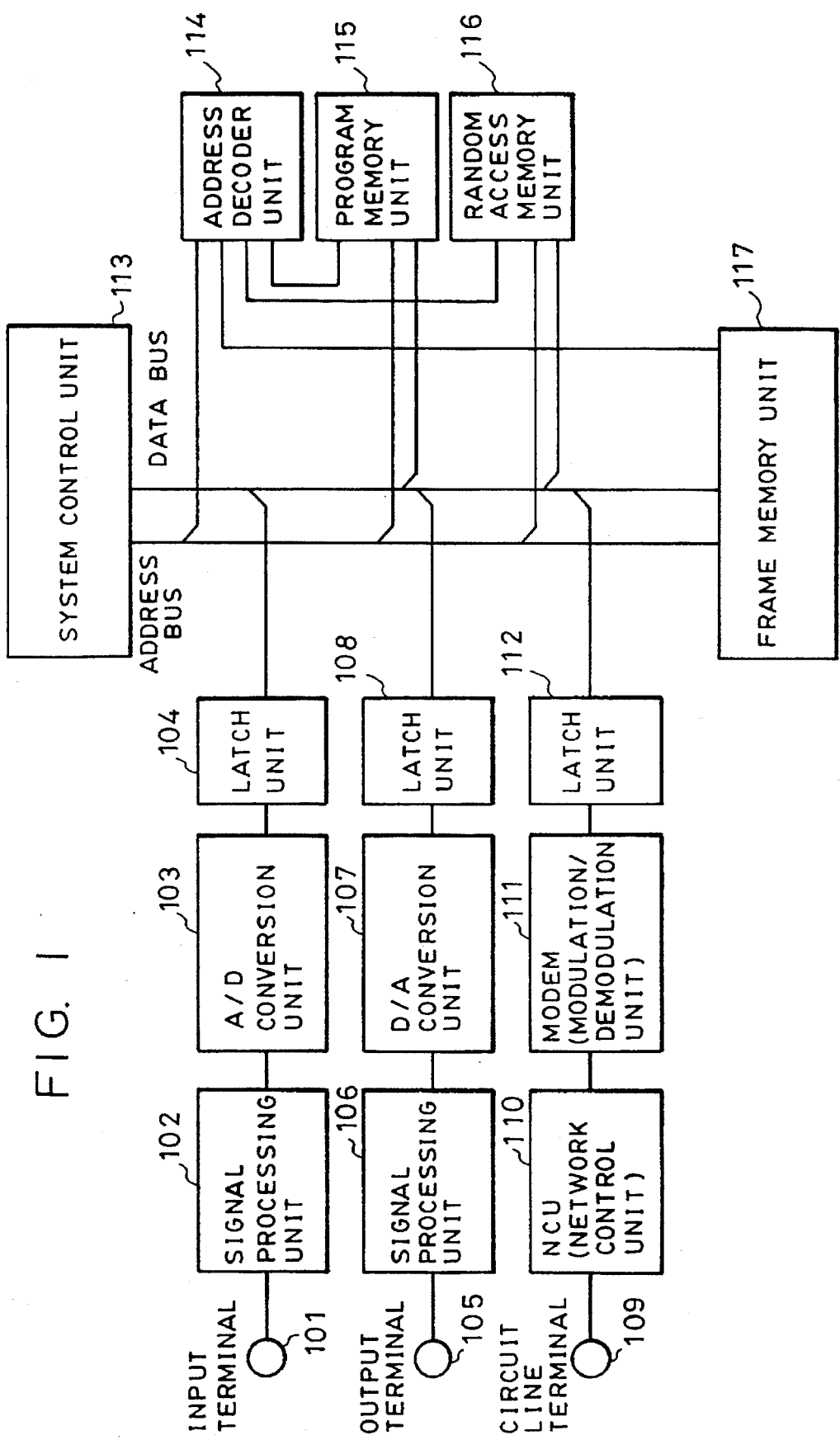
FIG. 1 is a block diagram of a first known type of video data transmission apparatus.
Figure 2:
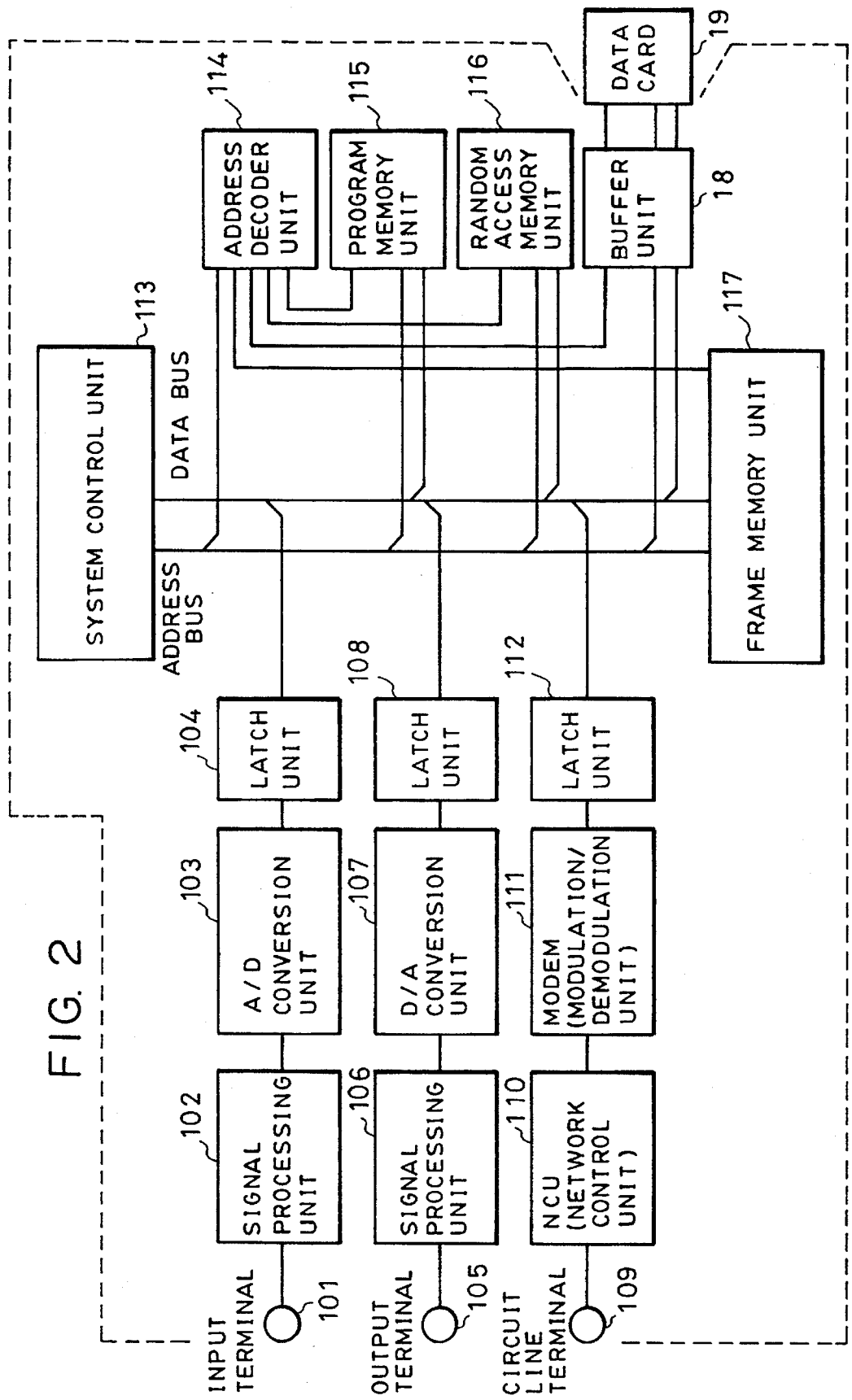
FIG. 2 is a block diagram of a first embodiment of the present invention.

Referring to FIG. 2 which shows the first embodiment, numerals 101 to 117 show the same components or units as those denoted by the same reference numerals in FIG. 1 which shows the known art. The first embodiment has a detachable data card 19 adapted to store video data inputted thereto through a buffer unit 18.

Figure 3:
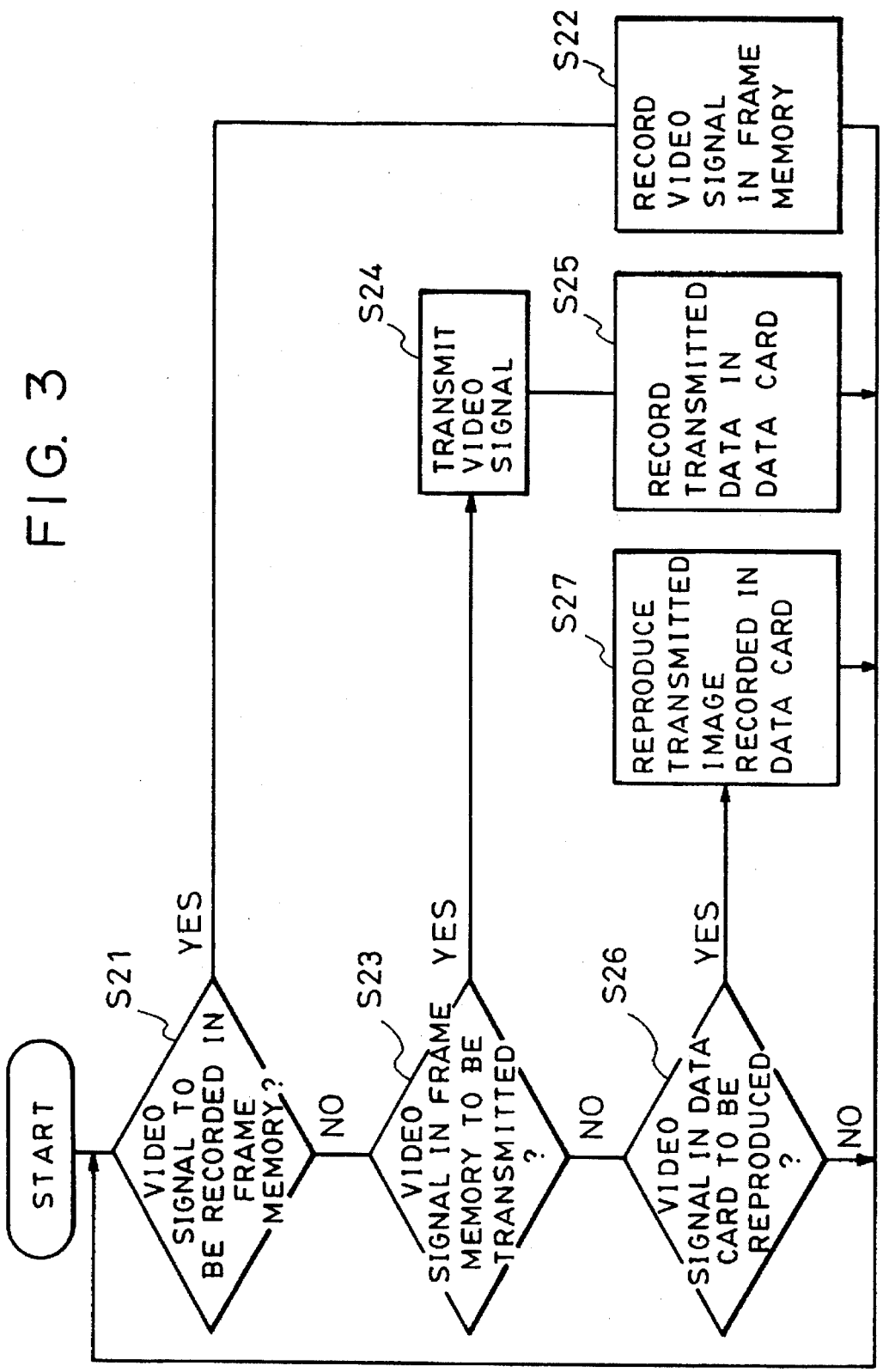
FIG. 3 is a flow chart showing an example of a control program stored in a program memory incorporated in the embodiment shown in FIG. 2.

FIG. 3 is a flow chart illustrating an example of the control program stored in the program memory unit 115 shown in FIG. 2.

Video data input through the input terminal 10 of the circuit shown in FIG. 2 are processed by a signal processing unit 102 and the processed video data is converted by an A/D conversion unit 103 into time-discrete digital video data. The digital signals are held by a latch unit 104 and are accessible from a common data bus. Referring to FIG. 3, when in Step S21 a control panel (not shown in FIG. 2) has selected a mode for recording video data, the process advances to Step S22 in which a system control unit 113 selects the frame memory 117 in accordance with a selection signal from an address decoder unit 114 shown in FIG. 2, so that video data latched by the latch unit 104 are stored in a frame memory unit 117.

In Step S23, when a mode for transmitting the video data is selected by the above-mentioned control panel, the process proceeds to Step S24 in which the video data stored in the frame memory of the circuit shown in FIG. 2 is combined with the communication control data on a random access memory 116 by the operation of the system control unit 113, whereby communication data is formed. The thus-formed communication data is output onto the data bus and is held by a latch unit 112. After a matching is attained by a MODEM 111 between the communication data and the circuit network, the communication data in the form of modulated signals is delivered to a circuit network through a circuit terminal 109 via an NCU 110.

After the transmission of the video data is over, the process proceeds to Step S25 of the flow shown in FIG. 3 in which the video data stored in the frame memory unit 117 of the circuit shown in FIG. 2 is delivered to the buffer unit 18 via an address bus and a data bus, under the control of the system control unit 113, and is recorded in the data card 19 as the digital image data which have been transmitted. At the same time, the address information concerning the address of the digital video data stored in the data card 19 is stored in the random access memory 116, under the control of the system control unit 113. Such address information is used as an index indicative of the stored video data when reproduction of the stored data is required.

Referring further to FIG. 3, when the control panel has selected an index number corresponding to the video data to be reproduced in Step S26, the process proceeds to Step S27 in which the system control unit 113 makes reference to the address information stored in the random access memory unit 116, and the video data stored in the data card at the designated address is output to the data bus. The video data output to the data bus is held by the latch unit 108 and is transformed into time-continuous video data by a D/A conversion unit 107. The time-continuous video data is then processed by a signal processing section 106 and is then output from the output terminal 105.

It is thus possible to confirm the video data at the transmission side, even after completion of transmission of the video data.

Although in the described embodiment video data which is the same as the transmitted video data is stored in the data card after completion of the transmission of the video data, this is not exclusive and the recording of the video data in the data card may be executed prior to the transmission. No substantial difference in the effect is caused by such a modification.

A second embodiment of the present invention will be described with reference to FIGS. 4 to 6.

A video data transmission apparatus as the second embodiment of the present invention has an arrangement for recording a plurality of batches of video data which has been transmitted or received. The construction of this apparatus will be described with reference to FIG. 4.

Figure 4:
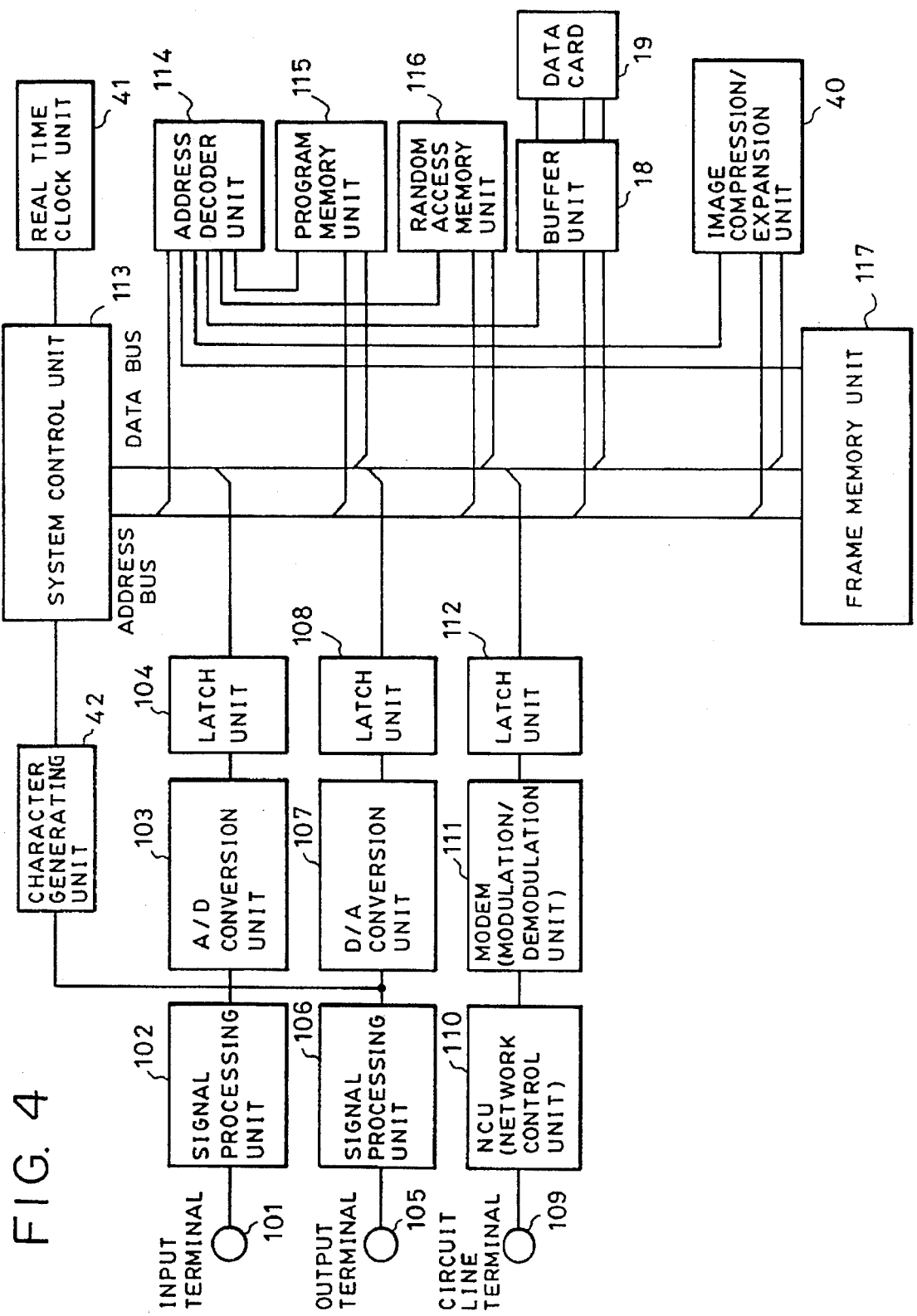
FIG. 4 is a block diagram of a second embodiment of the present invention.

Referring to FIG. 4, the video data transmission apparatus has an input terminal 101 through which video data is received, a signal processing unit 102 for processing the video data, an A/D conversion unit 103 for converting the input time-continuous video data into time-discrete video data, a latch unit 104 for latching the video data from the A/D conversion unit 103, an output terminal 105 through which video data is sent to a monitor (not shown) for reproduction, a signal processing unit for processing video data for reproduction, a D/A conversion unit 107 for converting time-discrete video data into time-continuous video data, a latch unit 108 for latching video data to be input to the D/A conversion unit 107, a circuit terminal 109 for connecting the video data transmission apparatus to a circuit network, an NCU (Network Control Unit) 110 for performing exchange of data with an opposite station through the circuit network, a MODEM 111 for modulating the video data in conformity with the electrical characteristics of the circuit network and for demodulating modulated data received from the circuit network into video data, a latch unit 111 for latching video information to be delivered to the MODEM 112 and for latching video data from the MODEM, a character generating unit 42 for converting the character data from the system control unit 113 into video data so as to enable character data to be displayed, a system control unit 113 for controlling the whole video data transmission apparatus, a real time clock unit 41 for showing data and time, an address decoder unit 114 for decoding address signals from the system control unit 113 so as to generate a chip select signal, a program memory unit 115 for storing a program to control the operation of the video data transmission apparatus, a random access memory unit 116 which provides a work area for the operation of the system control unit 113, a buffer unit 18 for an address bus and a data bus, a data card 19 for storing the video data transmitted, an image compression/expansion unit 40 for performing compression and expansion of the video data using, for example, a DCT technique (discrete cosine transformation), and a frame memory for storing the video data.

The apparatus having the described construction operates in accordance with a control program stored in the program memory unit 115 of the circuit shown in FIG. 4. An example of such a control program is illustrated by the flow chart shown in FIG. 5.

The operation of the second embodiment will be described with reference to FIG. 5.

In Step S401, when a mode for recording the video data is selected by a control panel (not shown), video data input through the input terminal 101 is converted by the A/D conversion unit 103 into digital video data which is then latched by the latch unit 104. Then, by an operation of the system control unit 113, the latched video data in the latch unit 104 is recorded in the frame memory unit 117.

Figure 5:
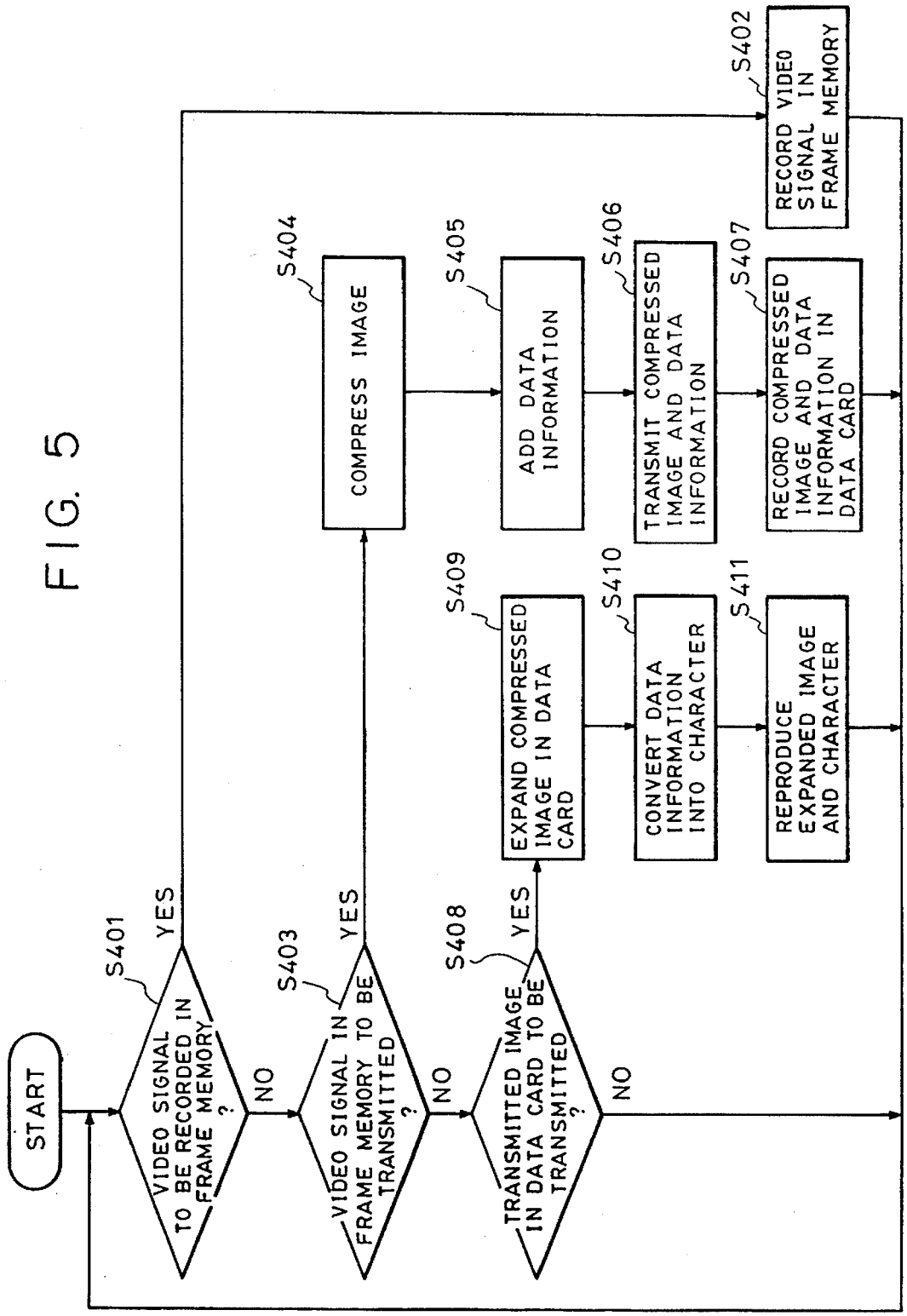
FIG. 5 is a flow chart showing an example of a control program stored in a program memory incorporated in the embodiment shown in FIG. 4.

Referring further to FIG. 5, when a mode for transmitting the video data is selected by the operation panel in Step S403, the process advances to Step S404 in which the system control unit 113 of the circuit shown in FIG. 4 reads the video data stored in the frame memory 117 and delivers the same to the image compression/expansion unit 40 through the data bus. The image compression/expansion unit 40 compresses the video data and the compressed video data is stored in the random access memory 116.

When the compression of the video data is over, in Step S405, the system control unit 113 reads time information indicative of the instant time from the real time clock unit 41. The system control unit 113 then combines the compressed video data on the random access memory 116 with the time information, thus forming video information data.

Referring further to FIG. 5, in Step S406, the system control unit 113 operates to combine the video data with communication control data, thus forming communication data, and delivers the thus-formed communication data to the data bus. The communication data output to the data bus is held by the latch unit 112 and, after matching is attained by the modem 111 between the communication data and the circuit network, is delivered to the circuit network via the NCU 110 and through the circuit terminal 109, as the modulated data.

After completion of the transmission of the video data, Step S407 of the flow shown in FIG. 5 is executed, in which the video information data stored in the random access memory 116 of the circuit shown in FIG. 4 is delivered to the buffer unit 18 via the address bus and the data bus, by the operation of the system control unit 113. The video data is then recorded in the data card 19 as the video data which has been transmitted. At the same time, the address information concerning the address at which the video information data is stored in the data card is recorded in the random access memory 116 by the operation of the system control unit 113. The address information stored in the random access memory is used as an index indicative of the transmitted video data when the latter is to be reproduced.

Referring further to FIG. 5, Step S408 is executed in which an index signal corresponding to the video data to be reproduced is selected by the operation panel. The process then proceeds to Step S409 in which the system control unit 113 makes a reference to the address information stored in the random access memory unit 116, so that the video data stored in the designated address of the data card 19 is read into the random access memory unit 116 via the data bus.

The video information data thus read into the random access memory unit 116 is then divided into compressed video data and time information by the operation of the system control unit 113. The separated compressed video data is input to the image compression/expansion unit 40 via the data bus so as to be expanded. Meanwhile, in Step S410, the time information is input to the character generating unit 42 as the character data for displaying time, by the operation of the system control unit 113. The character generating unit 42 then transforms the time information into video data. In Step S411, the video data output from the image compression/expansion unit 40 is delivered to the data bus under the control of the system control unit 113. The expanded video data delivered to the data bus is held by the latch unit 108 and is then delivered to D/A conversion unit 107 so as to be converted by the latter into time-continuous video data. The video time data formed as described before is then superposed on the time-continuous video data output from the D/A conversion unit 107, and the thus formed composite data is processed by the signal processing unit 106 and then output from the output terminal 105.

It is thus possible to store the transmitted video data in a data card after compression of the video data. In addition, when the transmitted video data is confirmed at the transmitting side, it is possible to know the time at which the video data was transmitted.

A modification of the described second embodiment will be explained hereinafter, with reference to FIGS. 4 to 6. FIG.

6 shows another example of the control program stored in the program memory unit of the apparatus shown in FIG. 4.

Figure 6:
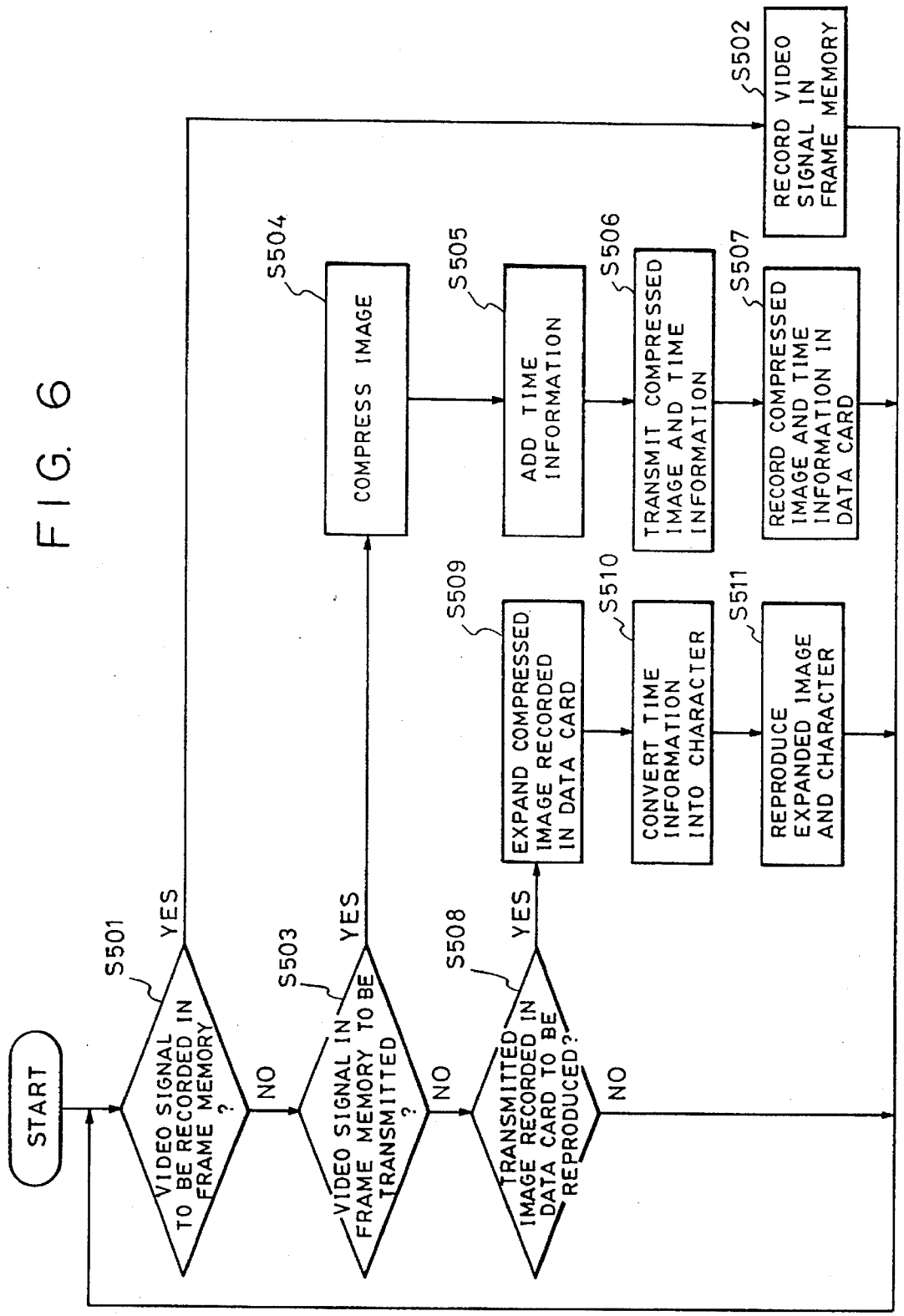
FIG. 6 is a flow chart showing another example of a control program stored in a program memory incorporated in the embodiment shown in FIG. 4.

Referring to FIG. 6, in Step S503, a control panel (omitted from FIG. 2) selects a mode for transmitting the video data, so that the process advances to Step S504 in which the system control unit 113 reads the video data stored in the frame memory 117 and delivers the same to the image compression/expansion unit 40 through the data bus. The image compression/expansion unit 40 then compresses the video data so that the compressed video data is stored in the random access memory 116.

When the compression of the video data is finished, the process proceeds to Step S505 of FIG. 6 in which the system control unit 113 operates to read the instant time information from the real time clock unit 41. The system control unit 113 then superposes the instant time information in the video data on the random access memory unit 116, thereby forming the video information data.

The process then advances to Step S506 in which the system control unit 113 combines the video information data with communication control data so as to form a communication data and delivers the communication data to the data bus. The communication data on the data bus is latched by the latch unit 112 and, after matching is attained by the modem 111 between the data and the circuit network, is output to the circuit network as the modulated data, via the NCU 110 and the circuit terminal 109.

After completion of transmission of the video data, the process proceeds to Step S507 of FIG. 6, in which the video information data stored in the random access memory 116 of FIG. 4 is delivered to the buffer unit 18 through the address bus and the data bus, under the control of the system control unit 113, and is recorded in the data card 19, as the video information data which has been transmitted. At the same time, the system control unit 113 operates to store, in the random access memory unit 116, address information concerning the address at which the transmitted video information data has been stored in the data card 19. The address information stored in the random access memory unit 116 is used as an index indicative of the video information data stored in the data card when reproduction of the video data is required.

Referring further to FIG. 6, Step S508 is executed in which the control panel (omitted from FIG. 4) selects the index signal corresponding to the video data to be reproduced. The process then proceeds to Step S509 in which the system control unit 113 makes a reference to the data cad address information stored in the random access memory unit 116, so as to read the video data of the designated address from the data card 19 into the random access memory unit 116. The thus read video information data is then divided by the system control unit 113 into video data and time information. The separate compressed video data is then delivered to the image compression/expansion unit 40 through the data bus so as to be expanded. In the meantime, the time information as the character data indicative of the time is input to the character generating unit 42 in Step S510 so as to be converted into video time character data and then output from the character generating unit 42.

Referring further to FIG. 6, Step S511 is executed in which the expanded video data output from the image compression/expansion unit 40 is output to the data bus, under the control of the system control unit 113. The expanded video data output to the data bus is held by the latch unit 108 and is converted by the D/A conversion unit 107 into time-continuous video data. The aforementioned time information is then superposed on the time-continuous expanded video data and the composite data thus obtained is output from the output terminal 105 after being processed by the signal processing unit 106.

It is thus possible to record the transmitted video data in the data card after compression of the transmitted video data. In addition, it is possible to know the time at which the data was transmitted, when the transmitted video data is confirmed at the transmitting side.

A third embodiment of the present invention will be described with reference to FIGS. 7 and 8.

Figure 7:
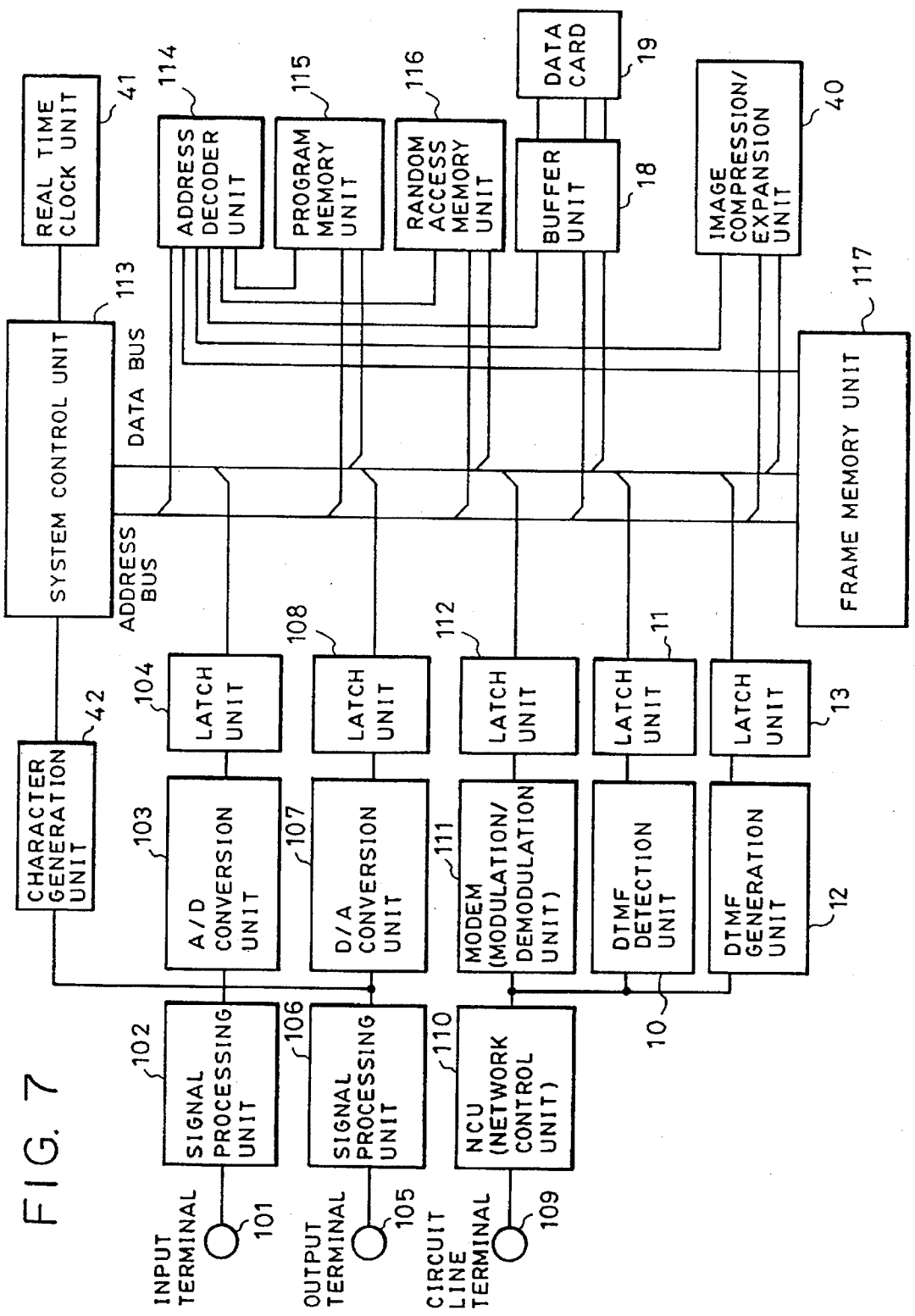
FIG. 7 is a block diagram of a third embodiment of the present invention.

Referring to FIG. 7, numerals 18 to 117 denote the components or units which are the same as those denoted by the same reference numerals in FIG. 4. This embodiment further has a DTMF detecting unit 10 which has a filter circuit for detecting a frequency band used for DTMF (Dual-Tone-Multi-Frequency) signal and a decoder circuit for decoding the image selection signal obtained from the detected frequency band. The embodiment further has a latch unit 11 for holding the image selection signal decoded by the DTMF detecting unit, a DTMF generating unit 12 by which the image selection signal from the system control unit 113 is converted into the DTMF signal, and a latch unit 13 for holding image selection signal to be inputted to the DTMF generating unit 12.

Figure 8:
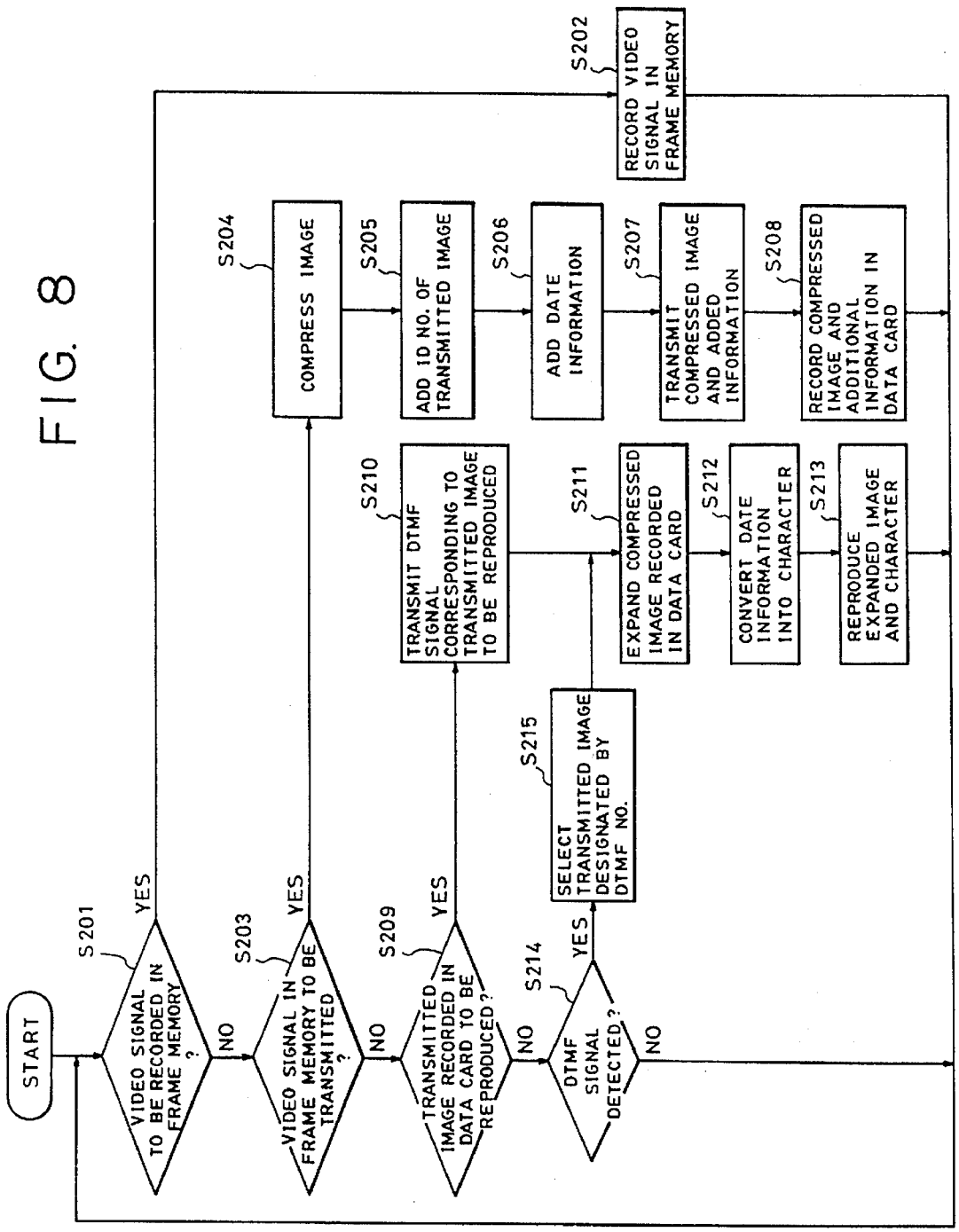
FIG. 8 is a flow chart showing an example of a control program stored in a program memory incorporated in the embodiment shown in FIG. 7.

FIG. 8 is a flow chart illustrating an example of the control program stored in the program memory unit 115 of the circuit shown in FIG. 7.

Referring to FIG. 8, when a mode for transmitting video data is selected by the control panel (omitted from FIG. 7) in Step S203, the process proceeds to Step S204 in which the system control unit 113 reads video data stored in the frame memory 117 and delivers the same to the image compression/expansion unit 40 via the data bus. The image compression/expansion unit 40 then compresses the video data and delivers the compressed video data to the random access memory unit 116 thereby to store the data in the unit 116.

After completion of the compression of the video data, Step S205 is executed in the flow shown in FIG. 8, in which the system control unit 113 forms an ID number peculiar to the video data which is to be transmitted and, in Step S206, the system control unit 113 reads the instant time information from the real time clock unit 41. The system control unit 113 then operates to combine the compressed video data in the random access memory unit 116 with the time information and the above-mentioned ID number, thus forming video information data. Then, Step S207 is executed in which the thus-formed video information data is combined with communication control data by the operation of the system control unit 113, whereby communication data is generated and output to the data bus. The communication data on the data bus is held by the latch unit 112 and, after a matching is obtained by the MODEM 111 between the data and the circuit network, is output to the circuit network as modulated video data, via the NCU 10 and the circuit terminal 109. After completion of transmission of the data, Step S208 of the flow shown in FIG. 8 is executed in which the system control unit 113 operates to read the video information data stored on the random access memory unit 116 and delivers the same to the buffer unit 18 via the address bus and the data bus, whereby the video information data is stored in the data card 19 as the video data which has been transmitted. At the same time, the address information concerning the address at which the video information data is stored in the data card 19 and the ID number of the transmitted video data are stored in the random access memory unit 116 by the operation of the system control unit 113. The address information and the ID number are used as indices for identifying the transmitted video data when reproduction of such data is necessary. Then, Step S209 is executed in which the control panel (omitted from FIG. 7) selects an index signal corresponding to the video data to be reproduced. Then, in Step S210, the system control unit 113 makes reference to the data card address information stored in the random access memory unit 116, and delivers to the latch unit 13 the ID number of the transmitted video data stored in the designated address of the data card 19, via the data bus. Upon receipt of the transmitted video data ID number, the DTMF generating unit 12 converts the ID number into DTMF signal which is then sent to the opposite station through the circuit network. In Step S214 of the flow shown in FIG. 8, the DTMF detecting unit 10 of FIG. 7 detects a DTMF signal which has been transmitted from the opposite station. The DTMF signal is converted into transmitted video data ID number which is then read into the random access memory unit 116 from the latch unit 11 via the data bus, and an index signal corresponding to this ID number is selected.

Then, Steps S211 to S213 of the flow shown in FIG. 8 are executed in the same manner as Steps S409 to S411 in the flow shown in FIG. 5, whereby the selected transmitted video data is reproduced.

The Steps S214 and subsequent steps are executed also at the opposite station when DTMF signal is detected in the opposite station, so that the same transmitted video data can be reproduced both at the transmitting station and the receiving station.

As will be understood from the foregoing description, in the first to third embodiment of the present invention as described, video data which is the same as the video data which has been transmitted or the video data which is to be transmitted is written on a data card, and the image is reproduced as desired on the basis of the video data stored in the data card. It is therefore possible to confirm the video data which has been transmitted.

In addition, the storage capacity of the data card is efficiently used because the video data stored therein has been compressed before the storage.

Furthermore, the data card can store, together with the transmitted video data, additional information such as the time at which the video data was transmitted, transmission ID number and so forth, thus facilitating administration of the transmitted video data.

It is also to be noted that, the first to third embodiments enables a desired video data out of a plurality of batches of video data stored in the data card and the selected video data to be reproduced while selection information identifying the reproduced video data is transmitted to the opposite station. It is therefore possible to confirm the same video data both at the transmitting station and the receiving station.

A detailed description will now be given of fourth and fifth embodiments which pertains to the second aspect of the invention, with specific reference to FIGS. 9 to 16.

Figure 9:
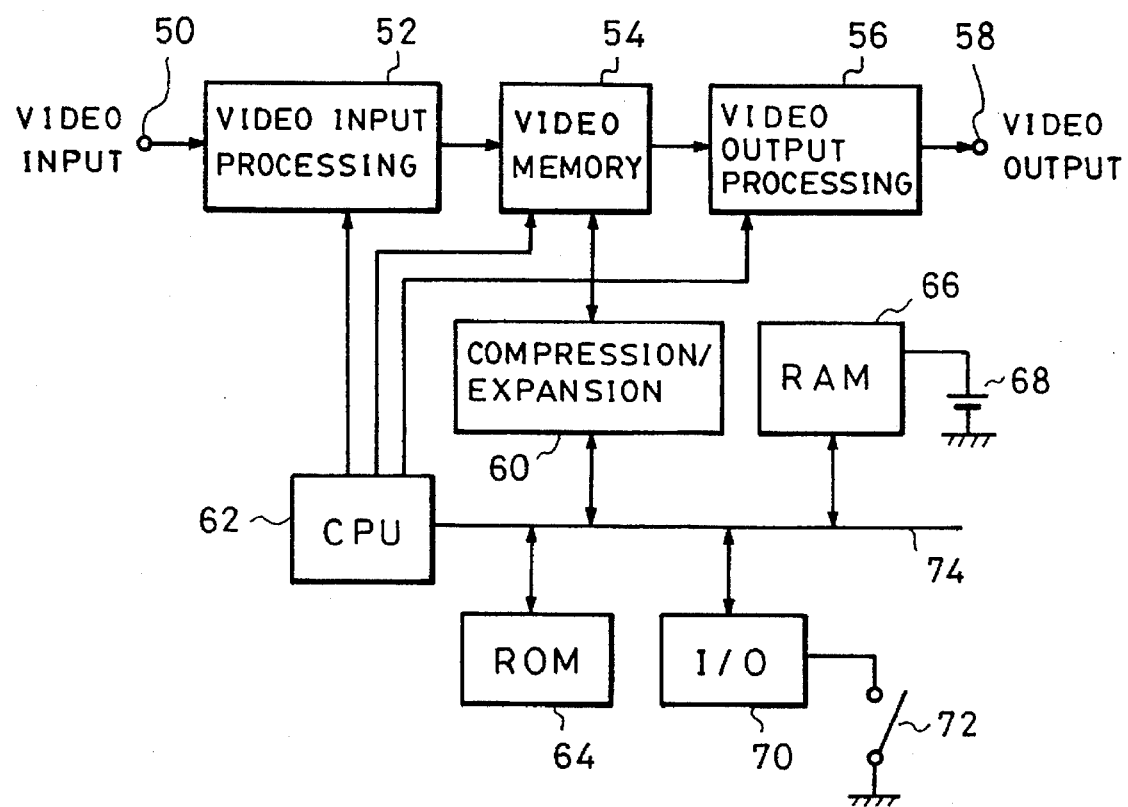
FIG. 9 is a schematic block diagram of a fourth embodiment of the present invention.

FIG. 9 is a schematic block diagram of the fourth embodiment. The fourth embodiment has the following components or units: an analog video signal input terminal 50, a video input processing circuit 52 for performing input processing, e.g., A/D conversion, on the analog video input signal input from the input terminal 51; a video memory 54 for temporarily storing video data output from the video input processing circuit 52; a video output processing circuit 56 which conducts output processing, e.g., D/A conversion, on the video data output from the video memory 54; and a video output terminal 58 through which the output from the video output processing circuit 56 is delivered to an external device such as a monitor. The video memory 54 has a capacity which is large enough to store at least one frame of the video data and is, for example, a dual port random access memory.

Numeral 60 designates a compression/expansion circuit which compresses video data stored in the video memory before the video data is stored in a later-mentioned storage means and expands compressed video data read from the storage means before the video data is written into the video memory 54. Numeral 62 designates a CPU which controls the operation of the whole system, 64 denotes a ROM for storing the control program and various constants necessary for the control, and 66 denotes a RAM which serves as the main storage of the CPU 62. The video data compressed by the compression/expansion circuit is stored in the RAM 66. The RAM 66 is backed up by a battery 68 so that it can hold its content even though the power supplied to other circuit portions is terminated.

Numeral 70 denotes an input/output circuit for connecting various operation switches including the freeze switch 72. The compression/expansion circuit 60, the CPU 62, the ROM 64, the RAM 66 and the input/output circuit 70 are connected together through a bus 74.

The CPU 62 also controls the video input processing circuit 52, the video memory 54 and the video output processing circuit 56, and freezes one frame out of the analog video data input to the input terminal 50 into the video memory 54 in response to operation of the freeze switch 72.

The compression/expansion circuit 60 operates to compress the video data stored in the video memory 54 each time the video data stored in the video memory 54 is updated, i.e., for each or a plurality of vertical scan periods, for each freezing initiated by the freeze switch 72 and/or for each of main-power cut-off instruction, and delivers the compressed data to the RAM 66. The compression/expansion circuit 60 also operates in response to a recovery instruction given by the user and/or closing of the main power circuit, so as to expand the compressed data in the RAM 66 and to write the expanded data into the video memory 54.

Figure 10:
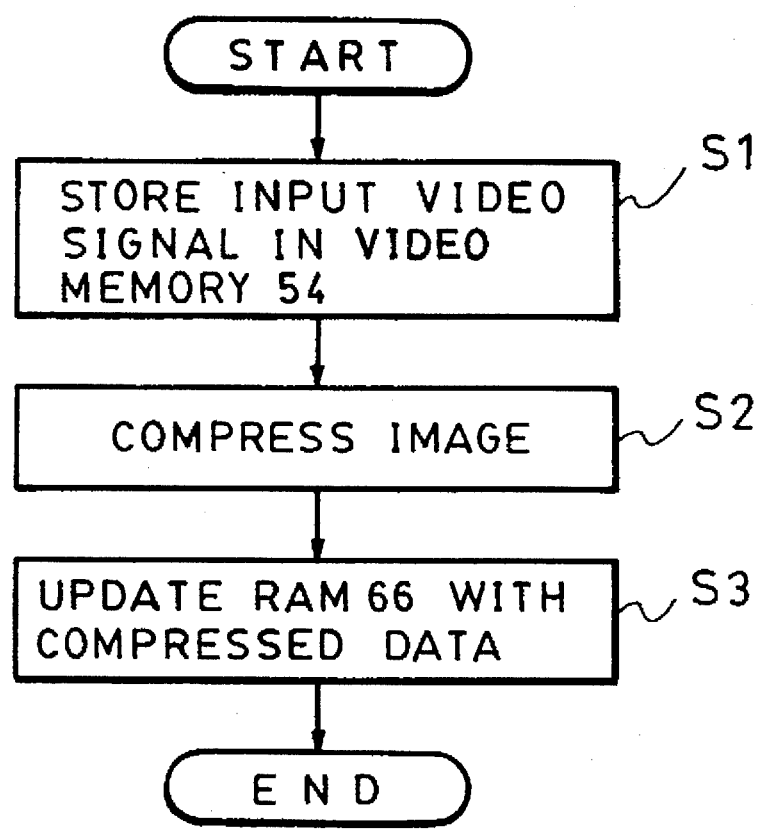
FIG. 10 is a flow chart showing back-up sequence executed by the embodiment shown in FIG. 9.
Figure 11:
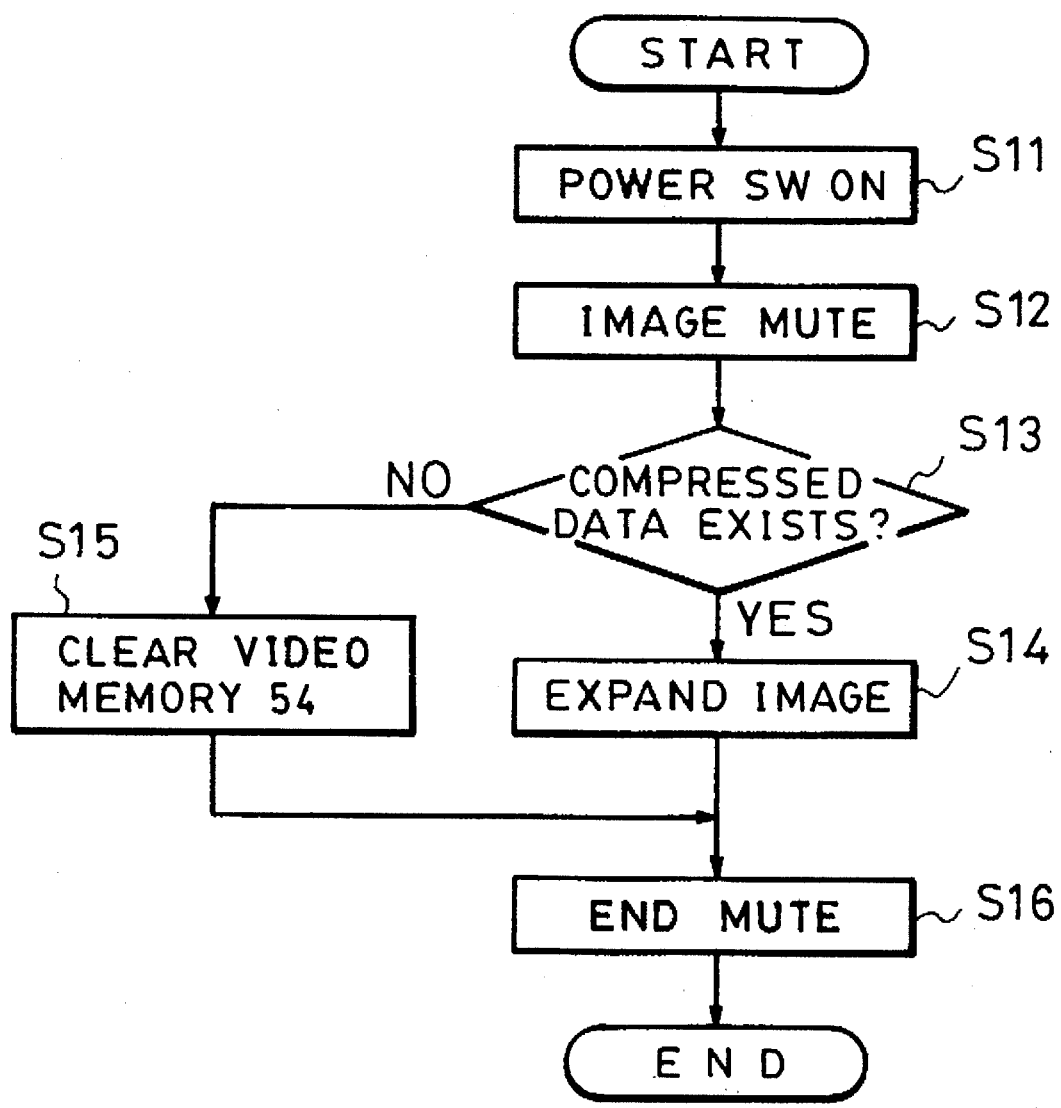

The operation of this embodiment will be described in detail with reference to flow charts shown in FIGS. 10 an 11. More specifically, FIG. 10 is a flow chart showing a flow of a process in which the compression of the video data is executed each time the data is updated, while FIG. 11 shows a flow of a process in which the compressed data is expanded and restored in the video memory when the power is turned on.

Referring also to FIG. 9, analog video data received by the input terminal 50 is processed by the video input processing circuit 52 and the processed video data is written in the video memory 54 (Step S1). Thus, the data stored in the video memory 54 is updated at a period equal to the vertical scan period of the analog video signals received by the video input terminal 50. The video data stored in the video memory 54 is read at a predetermined rate and is processed by the video output processing circuit 56. The thus-processed video data is then delivered to an external device through the video output terminal 58.

The compression/expansion circuit 60 compresses the video data stored in the video memory 54 each time the data in the video memory 54 is updated, i.e., at the same period as the vertical scan period of the analog video signals received by the input terminal 50 (Step S2). The compressed data is written into the RAM 66 (Step S3).

The RAM 66 is always supplied with electrical power necessary to retain its content, by virtue of the battery backup 68. The data stored in the RAM 66, therefore, is kept without being lost even when the main power supply to the circuit portions other than the RAM 66 is terminated.

The CPU 62 inhibits updating of the data in the video memory 54 in response to the operation of the freeze switch 72, so that the input video data can be frozen in the video memory 54. The compression/expansion circuit 60 also is responsive to the freezing operation so that it compresses the frozen video data in the video memory 54 and delivers the compressed frozen data to the RAM 66.

Referring now to FIG. 11, when a power supply switch (not shown) is closed to recover the main power supply (Step S11), so that the video output processing circuit 56 is set to video output muting state (Step S12). Then, whether the RAM 66 holds compressed data is examined (Step S13). If there is a compressed data in the RAM 66, the compression/expansion circuit 60 is activated so as to expand the compressed data and to write the expanded video data in the video memory 54 (Step S14). Conversely, if no compressed data is held in the RAM 66, the video memory 54 is cleared (Step S15). Then, the muting state of the video output processing circuit 56 is ended (Step S16).

Therefore, any video data backed up in the RAM 66 can be delivered to the external device without delay. For instance, the video data can be monitored through a monitor device when such a device is connected to the output terminal 58.

Figure 12:
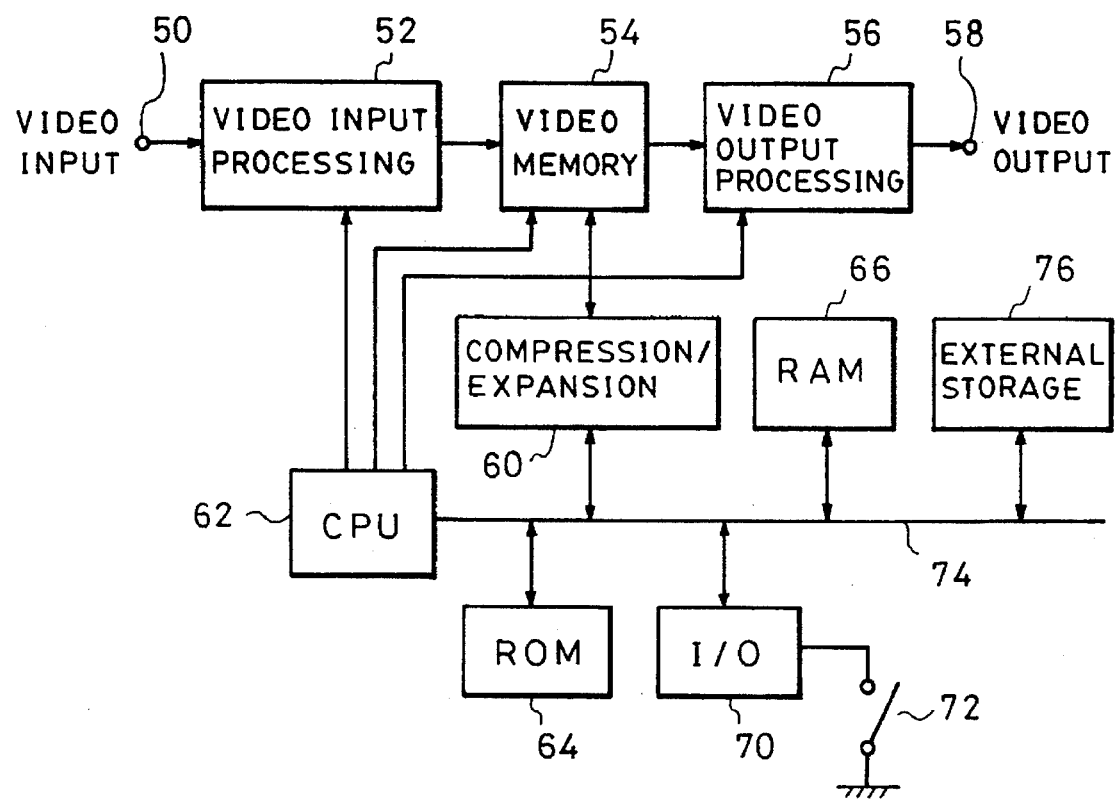
FIG. 12 is a schematic block diagram of a modification of the embodiment shown in FIG. 9.

FIG. 12 schematically shows a modification in which the compressed video data is stored in an external storage device 76, unlike the arrangement shown in FIG. 9 in which the compressed video data is stored in the RAM 66. In this Figure, the same reference numerals are used to denote the same components or units as those appearing in FIG. 9. More specifically, in the arrangement shown in FIG. 12, the external storage device 76 is connected to the bus 74 so that the video data compressed by the compression/expansion circuit 60 are stored in the external storage device 76. Consequently, the battery backup 68 and control circuit (not shown) for the backup control, which are necessary in the circuit shown in FIG. 9, can be dispensed with. The external storage device may be a hard disk device, a battery-backed up volatile memory or a memory card made of a non-volatile memory medium.

Figure 13:
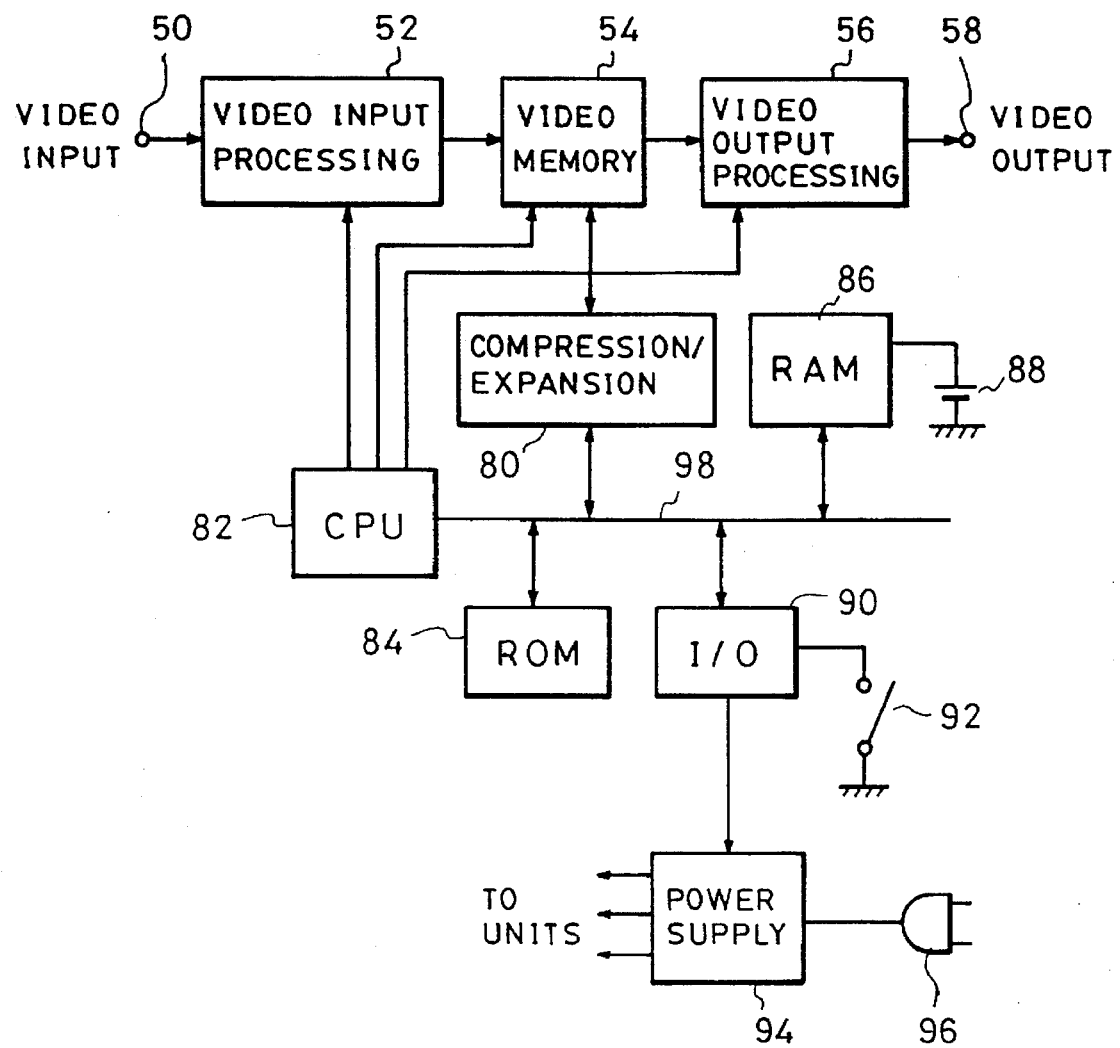
FIG. 13 is a schematic block diagram of a fifth embodiment of the present invention.

FIG. 13 is a block diagram of a fifth embodiment of the invention of this application in which video data stored in the video memory 54 is backed up by compression which is conducted in response to opening of a power supply switch. In FIG. 13, the same reference numerals as those used in FIG. 9 denote the same components or units as those in the circuit of FIG. 9.

The fifth embodiment shown in FIG. 13 has a compression/expansion circuit 80 similar to the circuit 60 shown in FIG. 9, a CPU 82 which controls the operation of the whole system, a ROM 84 which stores various control programs and various constants used for the controls, and a RAM 86 which serves as the main storage of the CPU 82. In this embodiment, video data compressed by the compression/expansion circuit 80 is stored in this RAM 86. The RAM 86 is backed up by a battery 88 so that it can retain its content even when the power supplied to other circuit portions is terminated.

Numeral 90 designates an input/output circuit which is adapted to connect various operation switches including a power supply switch 92 which is a soft switch. A power supply circuit 94 is capable of converting a commercial A.C. power into D.C. power and supplying the D.C. power to various portions of the system. Numeral 96 designates a plug for connection to the A.C. commercial source. Preferably, the battery 88 is a secondary battery which is adapted to be charged through the power supply circuit 94 when the plug 96 is connected to the commercial power source or when the power supply circuit 94 is operating.

The compression/expansion circuit 80, the CPU 82, the ROM 84, the RAM 86 and the input/output circuit 90 are connected together through a bus 98. A signal indicative of the operation of the power supply switch 92 is transmitted to the CPU 82 via the input/output circuit 90 and the bus 98.

The power supply circuit 94 becomes active as the power supply switch 92 is turned on. The CPU 92 operates so as to render the power supply circuit 94 inactive through the input/output circuit 90, in response to turning off the power supply switch 92 or in a predetermined power saving state.

As in the case of the circuit shown in FIG. 9, the CPU 92 in this embodiment controls the video input processing circuit 52, image memory 54 and the video output processing circuit 56.

Figure 14:
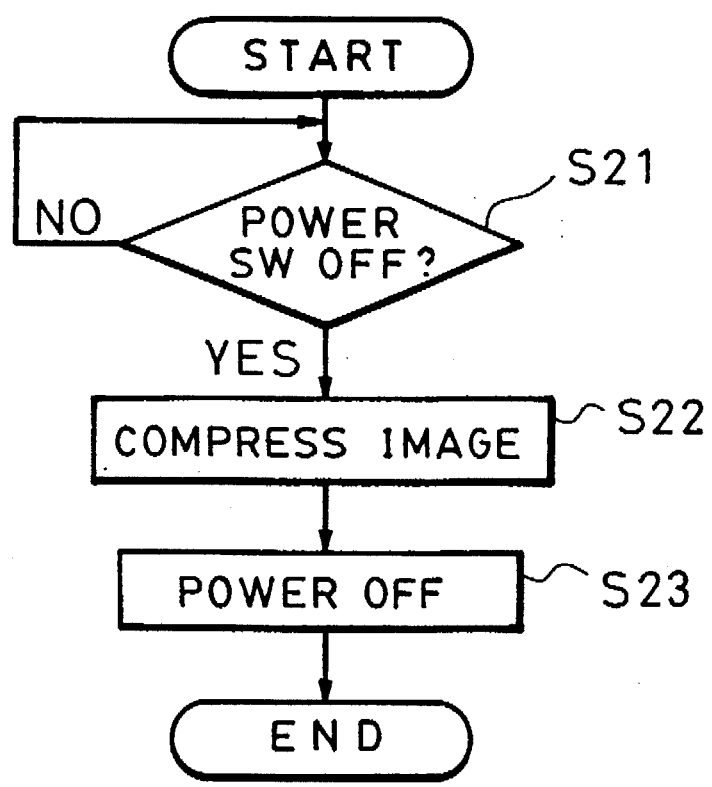
FIG. 14 is a flow chart showing back-up sequence executed by the embodiment shown in FIG. 13.
Figure 15:
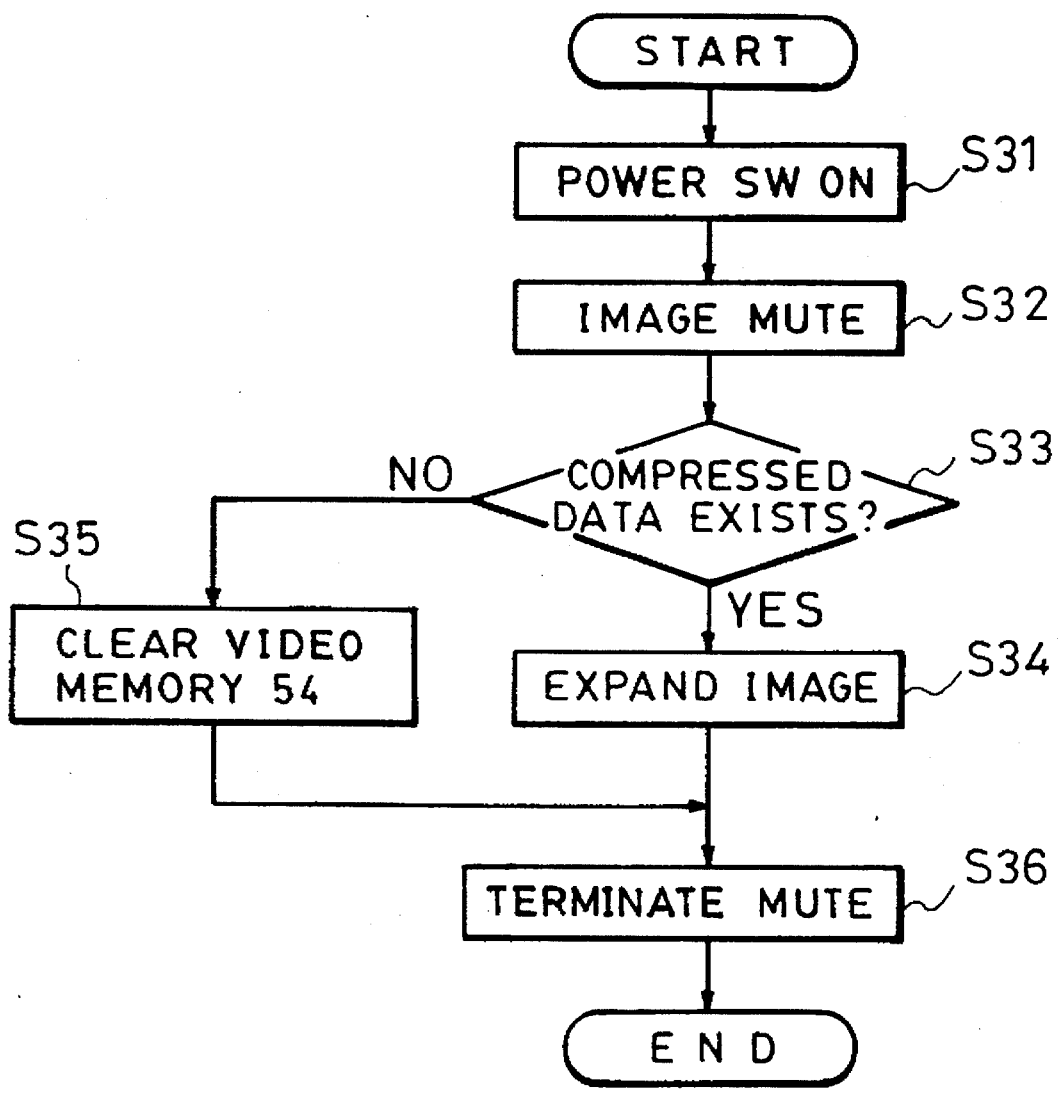

The operation of this embodiment will be described in detail with reference to the flow charts shown in FIGS. 14 and 15. FIG. 14 shows the flow of a process which is executed when the power supply switch 84 is turned off when the power supply of the system has been supplied with electrical power. FIG. 15 shows a flow of the process which is conducted when the power supply is turned on after a suspension of supply of the power.

Referring to FIGS. 13 and 14, when the power supply is on, the analog video signals received by the input terminal 50 are processed through the video input processing circuit 52, video memory 54 and the video output processing circuit 56 and is delivered from the system through the video output terminal 58, as in the circuit shown in FIG. 9.

When turn off of the power supply switch 92 is detected by the CPU 82 (Step S21), the CPU 82 operates the compression/expansion circuit 80 so as to compress the video data existing in the video memory 54 and writes the compressed video data in the RAM 86 (Step S22). Then, after writing the compressed data in the RAM 86, the CPU 82 controls the power supply circuit 94 through the input/output circuit 90, thereby putting the power supply circuit 94 into an inoperative state (Step S23).

As in the case of the circuit shown in FIG. 9, the RAM 86 is constantly supplied with necessary electrical power from the battery 88, so that it can hold the video data even after the power supply circuit 94 is put into its inoperative state.

Referring to FIGS. 13 and 15, when the power supply circuit 94 is put into its operative state as a result of turn on of the power supply switch 92 so as to supply electrical power to each component of the system (Step S31), the CPU 82 operates to set the video output processing circuit 56 into a video output muting state (Step S32). The CPU 82 then examines whether or not any compressed data is held in the RAM 86 (Step S33). If there is any compressed video data existing in the RAM 86, the CPU 82 operates to start the compression/expansion circuit 80, thereby expanding the compressed data and writing the expanded data into the video memory 54 (Step S34). If there is no compressed data existing in the RAM 86, the CPU 82 operates to clear the video memory 54 (Step S35) and then terminates the video output muting state of the video output processing circuit 56 (Step S36).

Therefore, any video data backed up in the RAM 86 can be delivered externally through the output terminal 58 without delay. The video data can be monitored when a monitoring display is connected to the output terminal 58.

Figure 16:
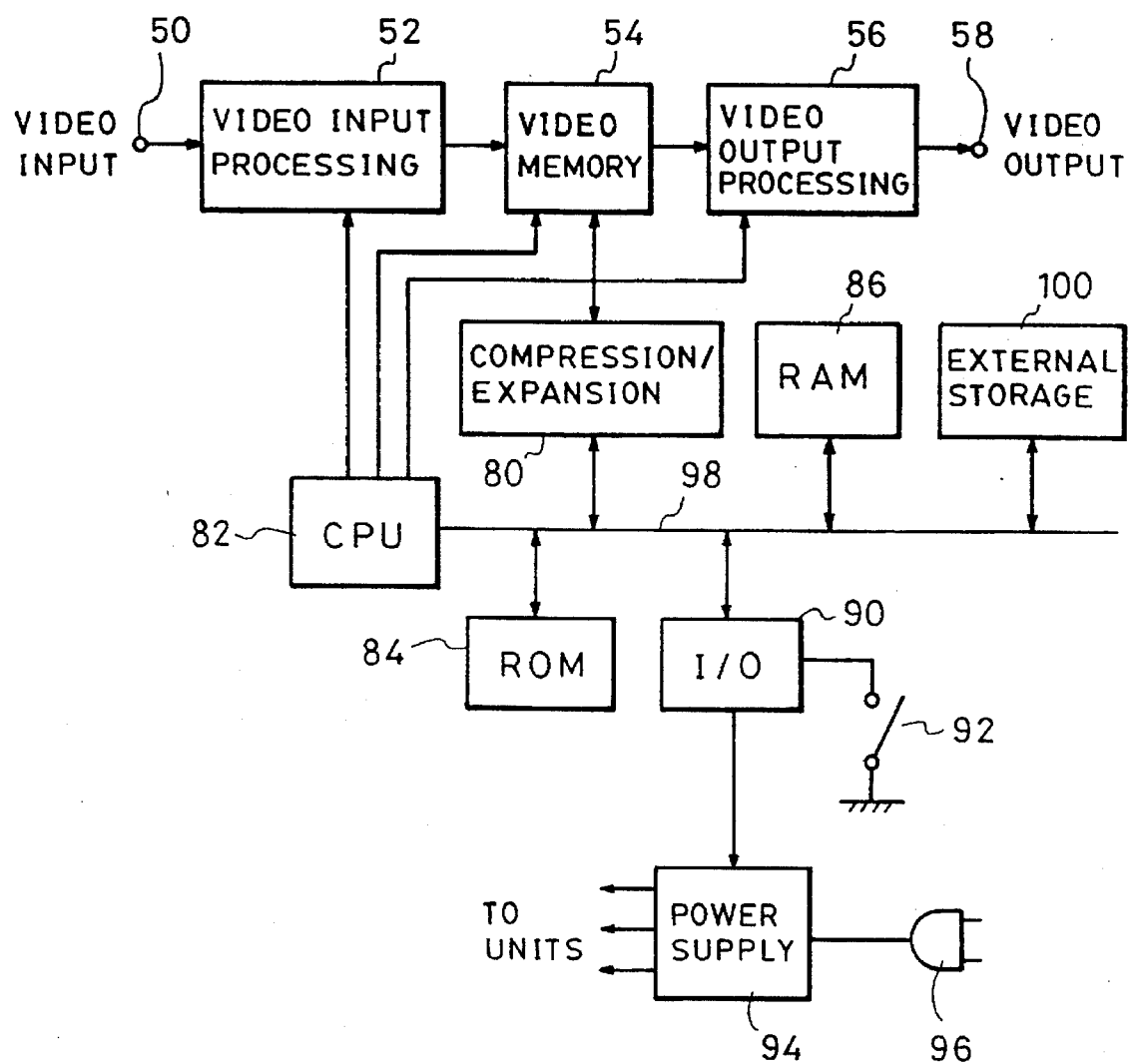
FIG. 16 is a schematic block diagram of a modification of the embodiment shown in FIG. 13.

FIG. 16 schematically shows a modification of the embodiment shown in FIG. 13. In the modification shown in FIG. 16, as in the case of the arrangement of FIG. 12 which is a modification to the embodiment shown in FIG. 9, the compressed data is held in an external storage device instead of the RAM 86 used in the embodiment shown in FIG. 13. Thus, the same reference numerals are used in FIG. 16 as those used in FIGS. 9 and 13. Thus, in the modification shown in FIG. 16, an external storage device 100 is connected to the bus 98 so that the video data compressed by the compression/expansion circuit 80 is stored in the external storage device 100.

As in the case of the arrangement shown in FIG. 12, a suitable known memory device such as a hard disk device, a battery-backed up volatile memory or a memory card having a non-volatile memory medium can be used as the external storage device 100.

In the fourth and fifth embodiments as described, as well as in their modifications, the video data can be backed up with a reduced power consumption. In addition, in the embodiment shown in FIG. 9 and its modification shown in FIG. 12, the backed-up input video data can be updated at the video rate, without requiring any specific attention by the user. The embodiment shown in FIG. 13 and its modification shown in FIG. 16 offer an advantage in that, even when the power supply is turned off, the video data held at the moment of the turn off of the power can be recovered immediately when the power supply is turned on again.

As will be understood from the foregoing description, the present invention makes it possible to back up video data with reduced electrical power consumption. In addition, the capacity of the memory means for storing the data can be reduced because the video data is compressed prior to the storage in such storage means. It is also to be understood that the backup of the video data can be conducted automatically without requiring special attention by the user.

Although the invention has been described through specific examples, it is to be understood that the described embodiments are only illustrative and various and modifications may be made thereto without departing from the scope of the invention which is limited solely by the appended claims.

What is claimed is:

1. An image data transmission apparatus for transmitting image data comprising:

receiving means for receiving image data successively;

an temporary image memory for temporarily storing the image data received by said receiving means by the time of receiving the next image data by said receiving means;

transmission means for transmitting the image data stored in the temporary image memory to an external apparatus every time the next image data is stored in said temporary image memory;

writing means for writing at the time of each transmission of the transmission means, in a non-volatile memory card mounted in said image data transmission apparatus, the image data which is the same as the image data transmitted to said external apparatus by said transmission means;

selection means for selecting at least one of the image data which has been transmitted to said external apparatus by said transmission means; and output means for outputting the image data selected by said selection means from said non-volatile memory card.

2. An image data transmission apparatus according to claim 1, wherein the predetermined processing effected by said transmission means includes compression of said image data.

3. An image data transmission apparatus according to claim 1, wherein said predetermined processing effected by said transmission means adds to said image data additional information which includes at least one of date and time of the transmission, identification information for identifying the image data and the state of transmission.

4. An Image data transmission apparatus according to claim 1, comprising:

card receiving means for receiving a non-volatile memory card in which image data is stored;

data selection means for selecting at least on of the image data from among the image data stored in said non-volatile memory card;

output means for outputting the image data stored in said memory card;

output means for outputting the image data selected by said data selection means stored in said non-volatile memory card; and selecting information transmission means for transmitting selection information selected by said data selection means in order to output the same image data as selected by said data selection means in the external apparatus.

5. An image data transmission apparatus according to claim 1, comprising:

data storage means;

compression means for compressing image data stored in said temporary image memory and for writing the compressed image data in said data storage means;

expansion means for expanding the compressed image data stored in said data storage means and for writing the expanded image data in said temporary image memory; and control means for controlling said compression means and said expansion means, wherein said transmission means transmits the compressed image data stored in said data storage means to an external apparatus.

6. An image data backup apparatus according to claim 5, wherein said control means controls said expansion means in response to turn on of a power supply to said apparatus.

7. An image data backup apparatus according to claim 5, wherein said control means controls said compression means at least for each of operations for updating said image data stored in said image memory.

8. An image data backup apparatus according to claim 5, wherein said control means controls said compression means in response to a compressing operation which is conducted for compressing the image data stored in said image memory.

9. An image data backup apparatus according to claim 5, wherein said control means controls said compression means in response to turning off of a power supply to said apparatus.

10. An image data backup apparatus according to claim 5, wherein said data storage means includes a volatile solid memory medium and a battery for supplying electrical power to said volatile solid memory medium.

11. An image data backup apparatus according to claim 5, wherein said data storage means includes a non-volatile memory medium.

12. An image data backup apparatus according to claim 5, further comprising means for backing up the image data stored in said image memory while compressing said image data.

13. An image data backup apparatus according to claim 5, wherein said transmission means transmits the image data compressed in said data storage means to said external apparatus through a modem.

14. An image data transmission apparatus according to claim 1, further comprising A/D converting means for A/D converting the image data received by said receiving means.

15. An image data transmission apparatus according to claim 1, wherein said transmission means transmits the image data stored in said image memory to said external apparatus through a modem.

16. An image data transmission apparatus, comprising:

input means for inputting image data successively;

an temporary image memory for temporarily storing image data input by said input means by the time of inputting the next image data by said input means;

data transmission means for transmitting the image data stored in said temporary image memory to an external apparatus every time the next image data is stored in said temporary image memory;

data receiving means which, when said image data transmission apparatus is in a receiving mode, receives image data transmitted from said external apparatus;

card receiving means for receiving a non-volatile memory card in which the image data is stored;

data selection means for selecting at least one of the image data from among the image data received by said receiving means and the image data stored in the non-volatile memory card;

output means for outputting the image data selected by said data selection means from said data receiving means or the image data from said non-volatile memory card; and selection information transmission means for transmitting, to the external apparatus, selection information concerning the image data selected by said data selection means in order to output the same image data as selected by said data selection means in the external apparatus.

17. An image data transmission apparatus according to claim 16 or 4, wherein said image data selected on the basis of said selection information is reproduced by said reproducing means in the transmitting apparatus.

18. An image data transmission apparatus according to claim 16, further comprising A/D converting means for converting the image data inputted by said input means.

19. An image data transmission apparatus according to claim 16, wherein the image data stored in said image memory is transmitted to said external apparatus through a modem.

20. An image data transmission apparatus according to claim 1, 16, or 4, wherein said memory means includes a detachable memory means.

21. An image data transmission apparatus according to claim 1, 16, or 4, wherein said memory means includes a data card.

22. An image data transmission apparatus according to claims 1, 16 or 4, further comprising D/A converting means for D/A converting the image data outputted by said output means.

23. An image data transmission apparatus according to claims 1, 16 or 4 wherein said output means is a display means.

* * * * *

UNITED STATES PATENT AND TRADEMARK OFFICE
CERTIFICATE OF CORRECTION

PATENT NO. : 5,659,675
DATED : August 19, 1997
INVENTOR(S) : Kurokawa et al.

It is certified that error appears in the above-indentified patent and that said Letters Patent is hereby corrected as shown below:

COLUMN 2:

Line 5, "can not" should read --cannot--.

COLUMN 10:

Line 46, "an" should read --and--.

COLUMN 13:

Line 50, "an" should read --a--.

COLUMN 14:

Line 14, "Image" should read --image--; and
Line 18, "on" should read --one--.

COLUMN 15:

Line 21, "an" should read --a--.

Signed and Sealed this

Twenty-fourth Day of March, 1998

Attest:

BRUCE LEHMAN

*Attesting Officer*  *Commissioner of Patents and Trademarks*